June 25, 1957　　　M. VAN PRAAG　　　2,796,688
DEVICE FOR FIXING A TRANSPARENCY
Filed March 12, 1951
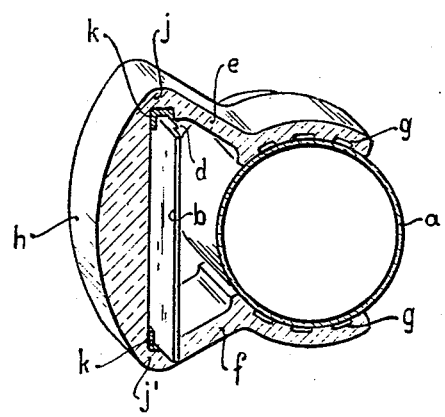
Inventor
Maurice van Praag
by
Stevens Davis Miller + Mosher
his attorneys

United States Patent Office 2,796,688
Patented June 25, 1957

2,796,688
DEVICE FOR FIXING A TRANSPARENCY

Maurice van Praag, Brussels-St. Gilles, Belgium

Application March 12, 1951, Serial No. 215,159

Claims priority, application Netherlands March 15, 1950

1 Claim. (Cl. 40—131)

This invention relates to a device for fixing a transparency bearing an image, sign, or the like, onto a luminous tube, or other tubular light source (for example, a fluorescent tube or tubular incandescent lamp).

A device of this nature was disclosed in Belgian Patent No. 481,196. The present invention concerns an improved device by means of which the transparency can be mounted on the tube with greater facility and greater stability, the device, moreover, only obstructing the light emitted by the luminous tube to a small extent.

The fixing device according to the invention is characterised in that the fixing action is obtained with the aid of means which grip the surface of the tube in elastic fashion.

It is an object of the present invention to provide a one-piece plastic framework which has complementary jaws that grip on a tube on opposite sides thereof and which are carried by arms that are connected to a lens portion which is transversely formed between the outer ends of the arms, the arms being resiliently attached thereto.

A framework made of resin is suitably provided with arcuate complementary clamping jaws having arms outwardly extending therefrom and joined by a lens portion, the jaws having inner faces provided with corrugations or other unevennesses to prevent displacement of the transparency relative to the tube engaged thereby, the arms being joined to the lens portion to produce a resiliency in the arms for urging the jaws relative to each other.

For a better understanding of the invention and the means for carrying it into effect reference will now be made to the accompanying drawings, in which:

The figure is a sectional perspective view of the one-piece plastic device showing the same attached on a luminous tube.

In the embodiment, illustrated in the drawing, the framework is molded in one-piece from suitable plastic material. The walls of the tube $a$ are gripped by means of the clamping jaws $g$, the inner faces of said jaws being provided with corrugations to increase the grip thereof. The jaws are arcuate and have side edges from which arms $e$ and $f$ extend, the arms being substantially straight and being disposed in opposing relation. The arms diverge outwardly and laterally from the jaws and terminate at a point beyond the jaws. The front face of the framework is constituted as a cylindrical lens $h$. The jaws $g$ and the arms $e$ and $f$ are resilient owing to the reduced thickness of the framework at $j$ and $j'$, which reduced portions are sufficiently remote from the tube as to avoid substantial decrease of the resiliency by the heating effect of the tube during operation thereof.

To prevent losses of light in lateral direction the plates $b$, $d$ are set in an opaque square or rectangular frame $k$ which is fitted in a channel formed at the junctures of the lens portion and the arms on their inside surfaces. Said frame is provided with a resilient circumferential edge portion adapted to yield when the plates are pushed into the frame and thereupon to resume its original position to lock the plates in the groove shown in the figure.

Adjacent frames may engage one another by straight half joints as shown, so that the various transparencies will be perfectly flush with one another and losses of light through gaps between the transparencies are avoided.

It is pertinent here to remark that the cylindrical lens $h$ increases the distance from which the sign is perceptible.

A framework as shown is so profiled as to be mouldable in any desired length. Such a moulding may be severed into sections of suitable lengths as by sawing, cutting, etc.

What I claim is:

A device for fixing a substantially plane transparency bearing a sign onto a luminous tube so that the transparency is disposed axially of the tube and is spaced radially therefrom, said device comprising a one-piece plastic framework including a pair of complementary arcuate jaws disposed in spaced confronting relation and adapted to grip a tube on opposite sides thereof, a substantially straight arm formed on a side edge of each jaw, said arms being disposed in opposing relation and diverging outwardly and laterally from the jaws to terminate at a point beyond the jaws, a transparent lens portion transversely formed between the outer ends of the arms and connecting the arms, said lens portion being adapted to overlie the whole transparency which is positioned immediately rearwardly thereof and spaced from the tube, the thickness of the framework at the juncture of the lens portion and the arms being reduced to produce a resiliency in the arms for urging the jaws relative to each other and the junctures of the lens portion and the arms being formed on their inside surfaces with channels for receiving the side edges of a transparency.

References Cited in the file of this patent

UNITED STATES PATENTS

| 576,267 | Green | Feb. 2, 1897 |
| 576,435 | Eddy | Feb. 2, 1897 |
| 577,033 | Holland | Feb. 15, 1899 |
| 1,027,621 | McComb | May 28, 1912 |
| 1,886,352 | Nickerson | Nov. 1, 1932 |
| 1,990,224 | Cochran | Feb. 5, 1935 |
| 2,156,553 | Vendope | May 2, 1939 |
| 2,277,433 | Guth | Mar. 24, 1942 |
| 2,448,244 | Arnold | Aug. 31, 1948 |
| 2,513,127 | Wolters | June 27, 1950 |
| 2,553,100 | Lynch | May 15, 1951 |

FOREIGN PATENTS

| 97,759 | Switzerland | Feb. 16, 1923 |